United States Patent
Hu et al.

(10) Patent No.: US 12,471,838 B2
(45) Date of Patent: Nov. 18, 2025

(54) SLEEP DETECTION METHOD AND APPARATUS, ELECTRONIC DEVICE AND STORAGE MEDIUM

(71) Applicants: GREE ELECTRIC APPLIANCES, INC. OF ZHUHAI, Zhuhai (CN); LEAYUN TECHNOLOGY CO., LTD. OF ZHUHAI, Zhuhai (CN)

(72) Inventors: Hongyuan Hu, Zhuhai (CN); Shaobin Li, Zhuhai (CN); Jie Tang, Zhuhai (CN); Daoyuan Chen, Zhuhai (CN); Miao Yang, Zhuhai (CN)

(73) Assignees: GREE ELECTRIC APPLIANCES, INC. OF ZHUHAI, Zhuhai (CN); LEAYUN TECHNOLOGY CO., LTD. OF ZHUHAI, Zhuhai (CN)

(*) Notice: Subject to any disclaimer, the term of this patent is extended or adjusted under 35 U.S.C. 154(b) by 420 days.

(21) Appl. No.: 18/067,190

(22) Filed: Dec. 16, 2022

(65) Prior Publication Data

US 2023/0121152 A1    Apr. 20, 2023

Related U.S. Application Data

(63) Continuation of application No. PCT/CN2020/140646, filed on Dec. 29, 2020.

(30) Foreign Application Priority Data

Jun. 17, 2020   (CN) .......................... 202010554753.2

(51) Int. Cl.
  *A61B 5/00*    (2006.01)
(52) U.S. Cl.
  CPC .......... *A61B 5/4809* (2013.01); *A61B 5/7246* (2013.01); *A61B 5/7282* (2013.01); *A61B 2562/0247* (2013.01)

(58) Field of Classification Search
  CPC ... A61B 5/4809; A61B 5/7246; A61B 5/7282; A61B 2562/0247; A61B 5/1113;
  (Continued)

(56) References Cited

U.S. PATENT DOCUMENTS 5,796,340 A * 8/1998 Miller ................. A61B 5/0205
                                                            600/534
2008/0275349 A1   11/2008   Halperin et al.
2019/0201267 A1    7/2019   Demirli et al.

FOREIGN PATENT DOCUMENTS

CN      107198516 A     9/2017
CN      108056765 A     5/2018
(Continued)

OTHER PUBLICATIONS

Extended European Search Report issued in counterpart European Patent Application No. 20940719.6, dated May 19, 2023.
(Continued)

*Primary Examiner* — Scott M. Getzow
(74) *Attorney, Agent, or Firm* — Westbridge IP LLC (57) ABSTRACT

Disclosed are a sleep detection method and an apparatus, an electronic device and a storage medium. The sleep detection method includes: collecting pressure information from a bed; detecting the pressure information collected within a continuous preset duration, and determining whether the pressure information includes a sleep parameter of a body sign from a sleeping human; and if the pressure information includes the parameter of the sleeping human body sign, turning on a sleep detection function to perform the sleep detection. The sleep detection method and the apparatus, the electronic device and the storage medium can be applied to an apparatus having a sleep detection function, such that the sleep detection function in the apparatus having the sleep (Continued)

detection function is automatically turned on without a manual operation of a user, thereby saving time and labor.

14 Claims, 4 Drawing Sheets

(58) Field of Classification Search
CPC ..... A61B 5/6891; A61B 5/0205; A61B 5/024; A61B 5/08
See application file for complete search history.

(56) References Cited

FOREIGN PATENT DOCUMENTS

| CN | 108523899 A | 9/2018 |
|----|-------------|--------|
| CN | 110051329 A | 7/2019 |
| CN | 110115583 A | 8/2019 |
| CN | 110575139 A | 12/2019 |
| CN | 111920379 A | 11/2020 |
| GB | 2558028 A | 7/2018 |
| JP | 2004351110 A | 12/2004 |
| JP | 2013034605 A | 2/2013 |
| JP | 2017202060 A | 11/2017 |
| JP | 2018094372 A | 6/2018 |

OTHER PUBLICATIONS

First Office Action issued in counterpart Chinese Patent Application No. 202010554753.2, dated Mar. 3, 2021.
International Search Report issued in corresponding PCT Application No. PCT/CN2020/140646, dated Mar. 31, 2021.
Written Opinion issued in corresponding PCT Application No. PCT/CN2020/140646, dated Mar. 31, 2021.

* cited by examiner

SLEEP DETECTION METHOD AND APPARATUS, ELECTRONIC DEVICE AND STORAGE MEDIUM

CROSS-REFERENCE TO RELATED APPLICATIONS

This application is a continuation of International Application No. PCT/CN2020/140646, filed on Dec. 29, 2020, which claims priority to Chinese Patent Application No. 202010554753.2, filed on Jun. 17, 2020. Both applications are incorporated herein by reference in their entireties.

TECHNICAL FIELD

The present disclosure involves a technical field of a smart device, in particular to a sleep detection method, an apparatus, an electronic device and a storage medium.

BACKGROUND

In the context of fast-paced work and life in society, the public's awareness towards health aspect is constantly changing and people start paying more attention to it, and the general concern of sleep problem has seriously become people's one of the most focus of attention.

If the sleep problem occurs, it may have negative physiological and psychological effects on human body. Taking advantage of the emerging consumer-grade sleep detection application technology for sleep detection can timely detect somnipathy problems and effectively help a user solve sleep problems.

At present, the existing consumer-grade sleep detection devices include sleep mattresses, sleep buttons or sleep detection belts, etc., which have similar functions and can realize sleep data detection. However, the way these devices enable the sleep detection requests user's manual operation, which is time-consuming and labor-intensive.

SUMMARY

The present disclosure provides a sleep detection method, an apparatus, an electronic device and a storage medium, to solve the above-mentioned technical problem that the sleep detection needs to be manually turned on.

In a first aspect, the present disclosure provides a sleep detection method, including:
  collecting pressure information from user on a bed;
  detecting the pressure information collected within a continuous preset duration, and determining whether the pressure information contains a sleep parameter of a body sign from a sleeping human; and
  if the pressure information contains the parameter of the sleeping human body sign, turning on a sleep detection function to perform the sleep detection.

In one possible implementation, before detecting the pressure information collected within a continuous preset duration, and determining whether the pressure information includes a sleep parameter of a body sign from a sleeping human, the sleep detection method further includes:
  determining whether there is someone on a bed according to the pressure information; and
  if there is someone on the bed, performing the step of detecting the pressure information collected within a continuous preset duration, and determining whether the pressure information includes a sleep parameter of a body sign from a sleeping human.

In one possible implementation, the pressure information includes a pressure value;
  the determining whether there is someone on the bed according to the pressure information includes:
  detecting whether the pressure information contains the pressure value that is greater than a preset pressure threshold;
  if the pressure information contains the pressure value that is greater than the preset pressure threshold, judging whether a continuous duration where the pressure value that is greater than the preset pressure threshold in the pressure information is less than a preset duration threshold; and
  if the duration of the pressure value that is greater than the preset pressure threshold in the pressure information is not less than the preset duration threshold, confirming that the human is on the bed; and
  if the duration of the pressure value that is greater than the preset pressure threshold in the pressure information is less than the preset duration threshold, confirming that the human is not on the bed.

In one possible implementation, the pressure information includes a pressure value;
  the detecting the pressure information collected within a continuous preset duration, and determining whether the pressure information includes a sleep parameter of a body sign from a sleeping human includes:
  generating a pressure curve according to the pressure information collected within the continuous preset duration;
  determining peaks in the pressure curve and the pressure values from each of the peaks accordingly;
  matching the pressure value corresponding to each of the peaks with a preset pressure interval corresponding to each preset body sign of sleeping human; and
  if there are target peaks whose pressure value matches the preset pressure interval corresponding to each preset body of sleeping human, determining that the pressure information includes the parameter of the body sign of the sleeping human.

In one possible implementation, before determining that the pressure information includes the parameter of the body sign of the sleeping human, the sleep detection method further includes:
  determining a time corresponding to each of the target peaks based on the pressure curve;
  calculating a counting frequency corresponding to each body sign of sleeping human according to the matching between the time from the target peak corresponding to each body sign of sleeping human, wherein the target peak corresponding to the body sign of sleeping human is a target peak whose pressure value matches the preset pressure interval corresponding to the preset body sign of sleeping human;
  matching the counting frequency corresponding to each sleeping human body sign with a preset frequency interval corresponding to each sleeping human body sign, respectively; and
  if there is sleeping human body sign whose counting frequency matches the preset frequency interval, determining that the pressure information collected within the continuous preset duration includes the parameter of the sleeping human body sign.

In one possible implementation, the sleeping human body sign includes at least one of heartbeat and breathing.

In one possible implementation, the collecting pressure information on a bed includes:

collecting an analog pressure signal from the bed through a pressure sensor disposed under a mattress;

amplifying the analog pressure signal, and then filtering the amplified analog pressure signal; and converting the filtered analog pressure signal into a digital signal, and using the digital signal as the pressure information on the bed.

In a second aspect, the present disclosure provides a sleep detection apparatus, including:

a pressure detection module, configured to collect pressure information from a bed;

a sleeping human body sign detection module, configured to detect the pressure information collected within a continuous preset duration, and determine whether the pressure information includes a parameter of a body sign from a sleeping human; and an open module, configured to turn on a sleep detection function to perform the sleep detection, if the pressure information includes the parameter of a body sign from a sleeping human.

In a third aspect, the present disclosure provides an electronic device, including: a processor; and a memory; the processor is configured to execute a processing program based on the data that is stored in the memory, so as to implement the sleep detection method described in the first aspect.

In a fourth aspect, the present disclosure provides a storage medium, the storage medium includes one or more programs, the one or more programs can be executed by one or more processors to implement the sleep detection method described in the first aspect.

Compared with the related technologies, the embodiments of the present disclosure propose the sleep detection method.

The above technical solutions provided by the embodiments of the present disclosure have the following advantages in comparison with the related technologies:

the sleep detection method according to the embodiments of the present disclosure includes: collecting pressure information from a bed; detecting the pressure information collected within a continuous preset duration, and determining whether the pressure information includes a parameter of a body sign a sleeping human; and if the pressure information includes the parameter of a body sign from a sleeping human, turning on a sleep detection function to perform the sleep detection. The solutions can be applied to an apparatus having a sleep detection function, such that the sleep detection function in the apparatus having the sleep detection function can be automatically enabled without user's manual operation, thereby saving time and labor.

BRIEF DESCRIPTION OF THE DRAWINGS

The drawings herein are incorporated into and form a part of the specification, showing embodiments in accordance with the present disclosure, and are used together with the specification to explain the principles of the present disclosure.

In order to describe the technical solutions in the embodiments of the present disclosure or the related technologies more clearly, a brief introduction to the drawings necessary for the description of the embodiments or the related technologies is given below. It's obvious that other drawings may also be obtained by general technicians in the art without any inventive efforts.

DETAILED DESCRIPTION OF THE EMBODIMENTS

In order to make this present disclosure's purposes, technical solutions and advantages clearer, the technical solutions in the embodiments of the present disclosure will be clearly and completely described below in combination with the accompanying drawings in the embodiments of the present disclosure. Apparently, the described embodiments are only a part, but not all, of the embodiments of the present disclosure. All of the other embodiments that may be obtained by the general technicians in the art based on the embodiments in the present disclosure without any inventive efforts fall into the scope protected by the present disclosure.

The sleep detector is an instrument with sleep detection function, the sleep detection function is a function used to monitor user's sleep quality. After the sleep detector's sleep detection function is turned on, sleep detector can collect user's sleep data, based on which to analyze user's sleep quality. Current sleep detectors generally require users to manually turn on the sleep detection function. From a long-term point of view, reducing user's involvement is indeed real "smart" device. As a result, the present disclosure provides a sleep detection method, in which the sleep detector's sleep detection function is turned on automatically without user's involvement and thus can be smoothly integrated into user's life and eliminate user's learning cost without the need of learning how to turn on sleep detection function and the efforts of manually turning on the sleep detector's sleep detection function each time before going to bed. Compared with frequent manual operation of turning on sleep detection function, zero involvement will bring more freedom and comforts to the user.

Figure 1:
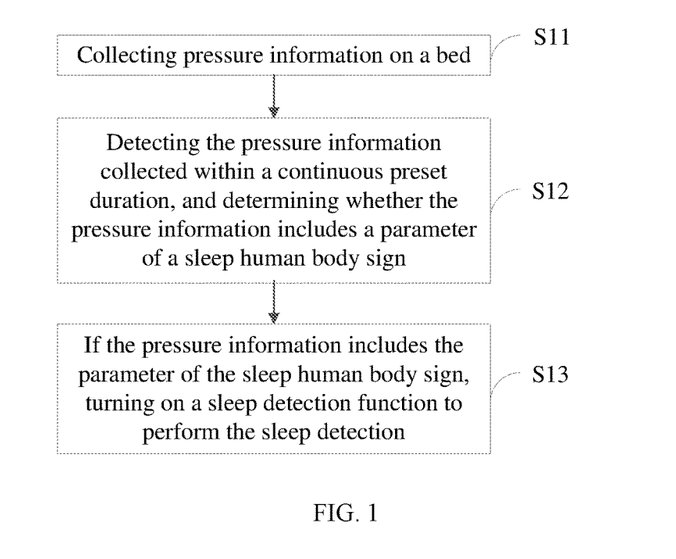
FIG. 1 is a flowchart of a sleep detection method according to an embodiment of the present disclosure.

FIG. 1 is a flowchart of a sleep detection method according to an embodiment of the present disclosure. This method may be applied to devices having a sleep detection function, such as a sleep detector, so as to realize automatic switch on of the sleep detection function. When the sleep detection function is turned on, sleep data of the user is monitored. As shown in FIG. 1, the method may include the following steps:

S11: collecting pressure information from a bed.

The pressure information is information that reflects a pressure value on the bed.

In the specific implementation, the pressure information on the bed may be collected through a pressure detection module, and the pressure detection module is disposed under a mattress. In order to achieve nondetectable monitoring, the mattress can have a certain thickness while ensuring monitoring accuracy. When the mattress is under a pressure, the mattress may generate pressure deformation, and the pressure deformation may be transmitted to the pressure detection module, so that the pressure information may be obtained by the pressure detection module according to the pressure deformation.

During the specific implementation, when the method is applied to the sleep detector, the pressure information on the bed may be collected by using the pressure detection module provided by the sleep detector.

S12: detecting the pressure information collected within a continuous preset duration, and determining whether the pressure information includes a sleep parameter of a body sign from a sleeping human.

A human body sign may include heartbeat, breathing, body movement, snoring, etc., and the parameter of the human body sign is data that are set to represent characteristics of the human body sign. For example, the characteristics of the human body sign may be heartbeat intensity, breathing intensity, body movement intensity, etc.

Because when a person is on the bed, their human body sign may produce corresponding pressure deformation on the mattress, so that the corresponding pressure information may be generated by the pressure detection module, usually, the pressure information may contain the data reflecting the characteristics of the human body sign, i.e., the parameter of the human body sign.

A posture of the user is usually different in a sleep state and a non-sleep state, for example, in the sleep state, the posture of the user in bed is usually a lying posture, while in the non-sleep state, the posture of user in bed is usually a sitting posture. Since the user's contact with the mattress in different postures is also different, the pressure deformation on the mattress is also different, which further makes the pressure information collected by the pressure detection module in user's sleep state and the non-sleep state different. In addition, some parameters of the human body sign can only be collected when the user is in the lying posture, such as heartbeat, breathing, etc. because the user's upper body is not in contact with the mattress in the sitting posture. When the user is in the sitting posture on the mattress, these parameters of the human body sign cannot be collected through the pressure detection module. The user is usually in the lying posture when he starts sleeping, and therefore, in this embodiment, it is considered that the user starts to sleep when he is in the lying posture, and these parameters of the human body sign that can be collected only when the user is in the lying posture are taken as the parameter of the body sign from sleeping human.

In this embodiment, the detected pressure information collected within the continuous preset duration is to determine whether the pressure information includes the data set to reflect the characteristics of the sleeping human body sign, i.e., the purpose of determining the parameter of the sleeping human body sign are to determine whether the user starts to sleep. If the pressure information includes the parameter of the body sign from a sleeping human, it is determined that the user has started sleeping, and if the pressure information does not include the parameter of the body sign from a sleeping human, it is determined that the user has not started sleeping.

The reasons for detecting the pressure information collected within the continuous preset duration are as follows: The pressure information collected within the continuous preset duration is continuous. If it is a single piece of pressure information or discontinuous pressure information where there is no reference value before and after, inaccurate detection results can be resulted when only detecting the above-mentioned isolated pressure information. Therefore, in this embodiment, the pressure information collected within the continuous preset duration is generated, so as to ensure the accuracy of the detection result. The preset duration is the time set according to specific requirement, such as 1 minute, etc., which is not specifically limited herein.

S13: if the pressure information includes the parameter of the body sign from a sleeping human, turning on a sleep detection function to perform the sleep detection.

If the pressure information does not include the parameter of the body sign from a sleeping human, the sleep detection function will not be turned on.

If the pressure information contains the parameter of the body sign from a sleeping human, it means that the user has started sleeping, and the sleep detection is turned on at this time. If the pressure information does not contain the parameter of the body sign from a sleeping human, it means that the user has not started sleeping, and the sleep detection is not turned on at this time. The sleep detection function may be automatically turned on without user's manual operation, and the sleep detection function is only turned on when it is determined that the pressure information contains the parameter of the body sign from a sleeping human (i.e., when the user has started sleeping), which avoids battery waste caused by turning on the sleep detection function when the user has not started sleeping.

In a specific implementation, if the method is applied to the sleep detector, when it is determined that the pressure information includes the parameter of the body sign from a sleeping human, the sleep detector is set to a monitoring state, and the sleep detection is performed on the user by using the sleep detector in the monitoring state. If the pressure information does not include the parameter of the body sign from a sleeping human, it means that the user has not started sleeping, then the sleep detector will be set to a standby state at this time (i.e., the sleep detection function will not be turned on), so as to reduce the energy consumption of the sleep detector.

The embodiments of the present disclosure provide the sleep detection method, including: collecting the pressure information on the bed; detecting the pressure information collected within the continuous preset duration, and determining whether the pressure information includes the parameter of the body sign from a sleeping human; and if the pressure information includes the parameter of the body sign from a sleeping human, it is indicating that the user has started sleeping, thus turning on the sleep detection function to perform the sleep detection. With the implementation of the current program, the sleep detection is automatically turned on without user's manual operation, thereby saving a lot of time and efforts.

Figure 2:
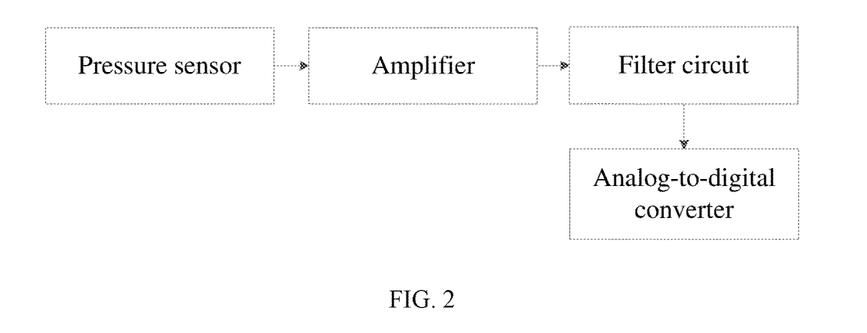
FIG. 2 is a schematic diagram of a pressure detection module according to an embodiment of the present disclosure.

On the basis of the above embodiments, as shown in FIG. 2, the pressure detection module may include a pressure sensor, an amplifier, a filter circuit and an analog-to-digital converter. Specifically, the pressure sensor may be disposed under the mattress during application. Collecting the pressure information from the bed by the pressure detection module will include the following contents:

An analog pressure signal from the bed is collected by the pressure sensor disposed under the mattress, but since a signal collected by the pressure sensor is usually small in amplitude, the analog pressure signal is amplified by the amplifier. The collected analog pressure signal usually contains some noise, in order to reduce adverse effects caused by the noise, the filter circuit is used to filter the amplified analog pressure signal. Since the steps such as S12 are usually performed by a single-chip microcomputer (such as an ADC module) set in the devices with the sleep detection function (such as sleep detectors), and the single-chip microcomputer cannot identify an analog signal, it is necessary to convert the filtered analog pressure signal into a digital signal through the analog-to-digital converter. The digital signal is used as the pressure information from the bed, and is sent to the single-chip microcomputer to perform the steps such as S12.

In a possible implementation, the filter circuit can be composed of a band-pass filter and a low-pass filter, or may also be composed of two groups of band-pass filters. The analog signal may be filtered twice by the filter circuit, so as to filter out more noise.

In a possible implementation, the pressure sensor may be a piezoelectric film sensor, and the analog pressure signal may be generated by the piezoelectric film sensor according to deformation caused by a piezoelectric film.

In this embodiment, the pressure information collected with the above manners may have some interference signals filtered out, and the analog pressure signal is converted into the pressure information that can be recognized by the single-chip microcomputer in the device with the sleep detection function, such as the sleep detector, so as to facilitate the subsequent processing.

On the basis of the above embodiments, before executing S12, the sleep detection method may further include:
determining whether there is someone on the bed according to the pressure information, if there is someone on the bed, performing S12, and if there is no one on the bed, not performing S12.

When there is no one on the bed, the method further includes setting the sleep detector to a standby state, thereby reducing the power consumption of the sleep detector.

In this embodiment, the execution of detecting whether there is someone on the bed is carried out first, and then S12 is executed when there is someone on the bed, which avoids the waste of electricity caused by executing S12 when there is no one on the bed, reduces the workload of the sleep detector, and further prolongs the lifetime of the sleep detector.

On the basis of the above embodiments, the pressure information includes a pressure value, and the determining whether there is someone on the bed according to the pressure information includes:
detecting whether the pressure information contains a pressure value that is greater than a preset pressure threshold; if the pressure information contains the pressure value that is greater than the preset pressure threshold, judging whether a duration of the pressure value that is greater than the preset pressure threshold in the pressure information is less than a preset duration threshold; if the duration of the pressure value that is greater than the preset pressure threshold in the pressure information is not less than the preset duration threshold, confirming that the human is on the bed; and if the duration of the pressure value that is greater than the preset pressure threshold in the pressure information is less than the preset duration threshold, confirming that the human is not on the bed.

The preset pressure threshold is a pressure value set based on the requirements. For example, a corresponding pressure value can be calculated according to the weight of the user and the weight of the mattress, and the calculated pressure value can be used as the preset pressure threshold.

When the pressure information contains the pressure value greater than the preset pressure threshold, it means that there is the user on the mattress at this time.

However, there are times that the user may just stay on the mattress for a short amount of time and then leave the mattress, and at this time, it is not necessary to perform S12 either. Therefore, in the embodiment, in order to reduce the workload of the sleep detector, after it is confirmed that the user is on the mattress, it is also determined whether the continuous duration of the pressure value that is greater than the preset pressure threshold in the pressure information is less than the preset continuous duration threshold, which is to determine whether the continuous duration of the user staying on the mattress reaches the preset continuous duration threshold. When the continuous duration of the pressure value that is greater than the preset pressure threshold in the pressure information is not less than the preset duration threshold, it is determined that the continuous duration of the user staying on the mattress has reached the preset continuous duration threshold, and then S12 is executed. If the continuous duration of the pressure value that is greater than the preset pressure threshold in the pressure information is less than the preset continuous duration threshold, it is determined that the continuous duration of the user staying on the mattress does not reach the preset continuous duration threshold, and S12 is not executed. The continuous duration threshold is set according to specific needs.

In this embodiment, it is simple and convenient to detect whether there is someone on the mattress by judging the pressure value, which requires a small amount of calculation. After it is determined that there is someone on the mattress, it is further determined whether the continuous duration of the user staying on the mattress reaches the preset continuous duration threshold. When the continuous duration of the user staying on the mattress has reached the preset continuous duration threshold, the output may be sent out to reflect the result that the user is on the bed, and then S12 is executed, which avoids power waste caused by executing S12 when the time for the user staying on the mattress is too short, and thereby reduces the workload of the sleep detector.

On the basis of the above embodiments, since the data reflecting the characteristics of the heartbeat and the breathing can only be collected when the user is in the lying posture on the mattress, and the user is usually going to sleep when being in the lying posture, in this embodiment, the heartbeat and the breathing can be used as the body sign of a sleeping human, and the data reflecting the characteristics of the heartbeat and the breathing are used as the parameter of the body sign from the sleep human.

Figure 3:
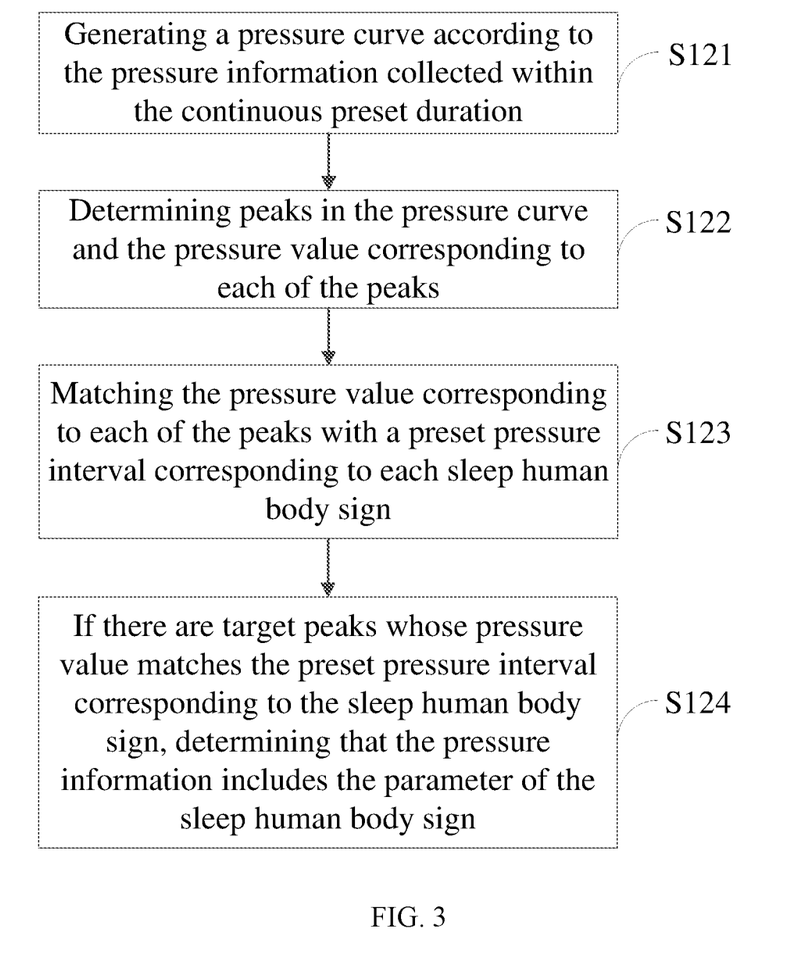
FIG. 3 is a schematic diagram of a method for detecting a sleep parameter of a body sign from a sleeping human according to an embodiment of the present disclosure.

On the basis of the above embodiments, as shown in FIG. 3, S12 may adopt the following steps to detect the pressure information collected within the continuous preset duration, and determine whether the pressure information includes the parameter of body sign from a sleep human.

S121: generating a pressure curve according to the pressure information collected within the continuous preset duration.

The pressure curve with time as the horizontal axis and the pressure value in the pressure information as the vertical axis may be generated based on the collected pressure information and the corresponding collection time.

S122: Determining peaks in the pressure curve and the pressure values from each of the peaks accordingly.

The pressure curve reflects the change of the pressure value with time during the continuous preset duration. Since the human body's heartbeat, breathing, body movement, snoring and other signs may cause pressure deformation on the mattress, and a magnitude and frequency of the pressure deformation caused by the heartbeat, breathing, body movement and snoring on the mattress fall into different intervals. Under the same conditions, in an amplitude response, the pressure deformation caused by body movement is the largest, breathing is the second, and heartbeat is the smallest, and it is reflected in the pressure curve that the pressure value corresponding to the body movement is the largest, the breathing is the second, and the heartbeat is the smallest. In a frequency response, the frequency of the body movement is uncertain, but a pressure value corresponding to the body movement may also be determined according to the pressure value, and the number of body movement and the duration of body movement may be easily calculated according to the time corresponding to the pressure value corresponding to the body movement. The frequency of the heartbeat and the breathing is usually regular, for example, the heartbeat of one person is about 60~70 beats/min during sleeping, i.e., the corresponding frequency is about 1~1.2 HZ, and the number of breaths is about ¼ of the heartbeat, which is 15~18 times/min, the corresponding frequency is also about ¼ of the heart rate, i.e., about 0.25~0.3 HZ. Therefore, these different parameters of the body sign from a sleeping human may be distinguished by different pressure values and/or the frequency of the corresponding pressure values.

S123: matching the pressure value corresponding to each of the peaks with a preset pressure interval corresponding to each preset body sign of a sleeping human.

A pressure interval corresponding to each human body sign is different, so the sleeping human body sign may be distinguished by the preset pressure interval.

For example, the breathing and heartbeat are taken as the sleep human's body sign, and the pressure intervals of the breathing and heartbeat on the mattress are preset. The pressure value corresponding to each of the peaks is compared with the pressure intervals corresponding to the breathing and the heartbeat. If the pressure value corresponding to the peak belongs to the pressure interval corresponding to the breathing, then the peak is the target peak designated to the breathing as the sleeping human body sign. Since the pressure value corresponding to the peak may reflect the intensity of the breathing, the pressure value corresponding to the peak is the parameter of the breathing as the sleeping human's body sign. If the pressure value corresponding to the peak belongs to the pressure interval corresponding to the heartbeat, then the peak is the target peak designated to the heartbeat as the sleeping human body sign. Since the pressure value corresponding to the peak may reflect the intensity of the heartbeat, the pressure value corresponding to the peak is the parameter of the heartbeat as the sleeping human's body sign.

S124: if there are target peaks whose pressure value matches the preset pressure interval corresponding to the sleeping human's body sign, determining that the pressure information includes the parameter of the sleep human body sign.

If the pressure value corresponding to the peak matches the pressure interval corresponding to one sleeping human's body sign, it means that the peak is generated by the corresponding sleeping human's body sign. For example, the heartbeat is designated as the sleeping human's body sign, and if a pressure value corresponding to one peak matches the pressure interval corresponding to the heartbeat, it means that this one peak is resulted from the heartbeat.

Since only after the user starts sleeping, the collected pressure information may includes the parameter of the body sign from a sleeping human. So as long as there is a target peak whose pressure value matches the pressure interval corresponding to the preset body sign from a sleeping human, it is determined that the pressure information contains the parameter of a body sign from the sleeping human.

If there is no target peak whose pressure value matches the pressure interval corresponding to the preset body sign from a sleeping human, it is determined that the pressure information collected within the continuous preset duration does not include the parameter of the body sign from a sleeping human.

In this embodiment, it is simple and convenient to determine whether there is a parameter of the body sign from a sleeping human in the collected pressure information based on the matching result between the pressure value corresponding to the peak in the pressure information and the pressure interval corresponding to the parameter of the body sign from a sleeping human.

Since the pressure value generated by the body movement is indefinite, sometimes the pressure value is large and sometimes small, thus there are times that the pressure value generated by the body movement may fall into the pressure interval corresponding to the sleeping human's body sign corresponding to the heartbeat or the breathing, etc. and there may be errors in the result of determining whether there is the parameter of the body sign from a sleeping human by the pressure value of the peak. On the basis of the above embodiment, after it is determined that there is a target peak, the frequency of the peaks corresponding to the sleeping human's body sign may also be calculated. If there is a sleeping human's body sign whose counting frequency falls into a preset frequency interval, it is determined that the parameter of the body sign from a sleeping human is included in the pressure information; if there is no sleeping human's body sign whose counting frequency falls into a preset frequency interval, it is determined that the parameter of the body sign from a sleeping human is not included in the pressure information. By judging the frequency, the interference caused by the pressure value generated by the body movement can be excluded. The frequency intervals corresponding to the body sign from a sleeping human when the user is in the sleeping state and the non-sleeping state are also different, and therefore, the frequency interval corresponding to the body sign from a sleeping human when the user is in the sleeping state can be set, so that whether the user is in the sleeping state can be more accurately determined through frequency comparison, and the final confirmation of the sleeping state can be more accurate.

Specifically, the frequencies may be compared in the following way:

determining a time corresponding to each of the target peaks based on the pressure curve; calculating a counting frequency corresponding to each body sign of a sleeping human according to the matching between the time from the target peak corresponding to each body sign from a sleeping human, wherein the target peak corresponding to the body sign from a sleeping human is a target peak whose pressure value matches the preset pressure interval corresponding to the preset body sign of a sleeping human; matching the counting frequency corresponding to each body sign of a sleeping human with a preset frequency interval corresponding to each preset body sign of a sleeping human, respectively; and if there are sleeping human's body signs whose counting frequency matches the preset frequency interval, it is determined that the pressure information collected within the continuous preset duration includes the parameter of the body sign from the sleeping human.

In this embodiment, through the above-mentioned method, the determination of the parameter of the body sign from a sleeping human can be more accurate.

On the basis of the above embodiments, after the sleep detection function is turned on by S13, the method can further include:

continuing to collect the pressure information on the bed; generating the corresponding pressure curve according to the collected pressure information; determining the peak corresponding to the pressure interval; determining the pressure value and the time corresponding to the peak; comparing the pressure value of the corresponding with the preset pressure interval corresponding to the human body sign to determine the human body sign of the corresponding peak; calculating the frequency corresponding to each human body sign based on the time of the peak corresponding to each human body sign; and comparing the frequency and the pressure value corresponding to each human body sign with the preset frequency interval and the preset pressure interval of various corresponding sleeping states to determine the sleeping state of the user.

The human body sign may include one or more of body movement, breathing, heartbeat, snoring, and the like.

In this embodiment, the user's human body sign is analyzed based on the pressure information to determine the user's sleeping state of the user. The results obtained are accurate and do not involve user operation, so as to realize user intervention-free sleep detection and thus improve user experience.

A specific example is given below.

Figure 4:
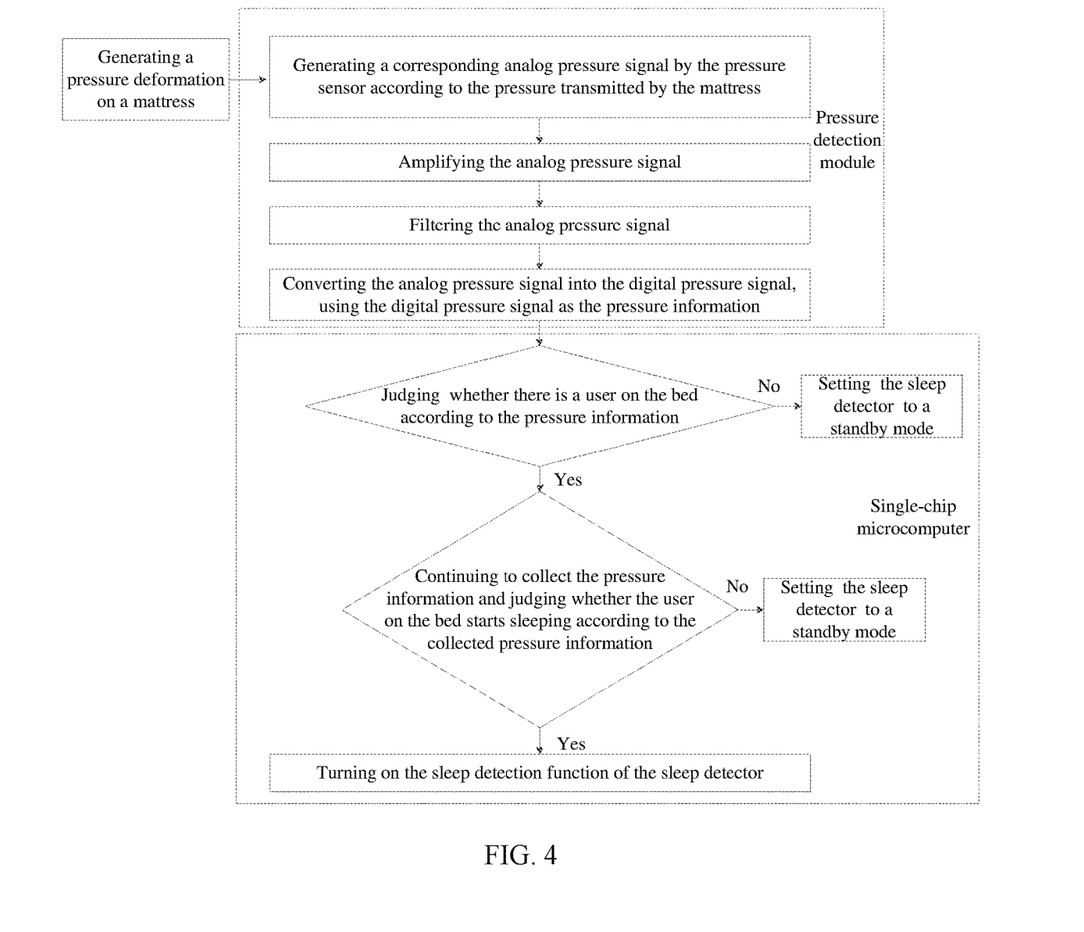
FIG. 4 is a schematic diagram of a sleep detection method according to one embodiment of the present disclosure.

Taking the sleep detection method provided by the embodiments of the present disclosure applied to the sleep detector as an example, as shown in FIG. 4, the process of the sleep detection method includes the following contents. First, when a pressure deformation is occurred on the mattress, a corresponding analog pressure signal is generated by the pressure sensor according to the pressure transmitted through the mattress, the analog pressure signal is input into the amplifier to amplify the analog pressure signal, and then the amplified analog pressure signal is filtered by the filter circuit, and after the amplified analog pressure signal is filtered, the analog-to-digital conversion module is used to carry out analog-to-digital conversion to obtain the digital pressure signal, which is used as the pressure information. The pressure information is transmitted to the single-chip microcomputer in the sleep detector. Through the single-chip computer, it can determine whether the user is on bed or not based on the pressure information, if it is detected that there is a user on the bed, it may continue to collect the pressure information and judge whether the user on the bed has started sleeping according to the collected pressure information. If the user has not started sleeping, the sleep detector is set to a standby mode, and if the user has started sleeping, the sleep detection function of the sleep detector is turned on to perform the sleep detection.

Figure 5:
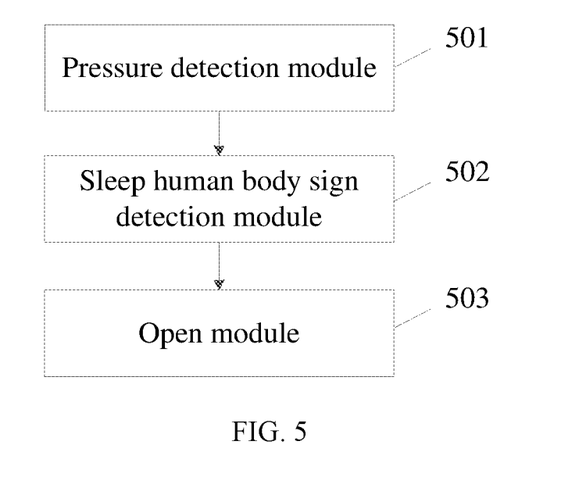
FIG. 5 is a block diagram of a sleep detection device according to an embodiment of the present disclosure.

The embodiments also provide a sleep detection apparatus, which is applied to a sleep detector, as shown in FIG. 5. The apparatus may include:

a pressure detection module 501, configured to collect pressure information from a bed;

a sleeping human body sign detection module 502, configured to detect the pressure information collected within a continuous preset duration, and determine whether the pressure information includes a parameter of body sign from a sleeping human; and an open module 503, configured to turn on a sleep detection function to perform the sleep detection if the pressure information includes the parameter of the body sign from a sleeping human.

In one possible implementation, the apparatus may also include a user detection module, configured to determine whether there is someone on the bed according to the pressure information before detecting the pressure information collected within a continuous preset duration, and determining whether the pressure information includes a sleep parameter indicating the body sign from a sleep human.

In one possible implementation, the pressure information includes a pressure value, the user detection module includes:

a pressure detection sub-module, configured to detect whether the pressure information contains the pressure value that is greater than a preset pressure threshold;

a duration detection sub-module, configured to detect a duration of the pressure value that is greater than the preset pressure threshold in the pressure information if the pressure information contains the pressure value that is greater than the preset pressure threshold; and a judgment sub-module, configured to judge whether the duration of the pressure value that is greater than the preset pressure threshold in the pressure information is less than a preset duration threshold; confirm that the user is on the bed if the duration of the pressure value that is greater than the preset pressure threshold in the pressure information is not less than the preset duration threshold; and confirm that the user is not on the bed if the duration of the pressure value that is greater than the preset pressure threshold in the pressure information is less than the preset duration threshold.

In one possible implementation, the pressure information includes a pressure value, the sleeping human body sign detection module includes:

a curve generation sub-module, configured to generate a pressure curve according to the pressure information collected within the continuous preset duration;

a peak information determination sub-module, configured to determine peaks in the pressure curve and the pressure values corresponding to each of the peaks;

a pressure matching sub-module, configured to match the pressure value to each of the peak with a preset pressure interval corresponding to each sleeping human body sign; and a first determination sub-module, configured to determine that the pressure information includes the parameter of the body sign from a sleeping human if there are target peaks whose pressure values match the preset pressure intervals corresponding to each of the body signed from the sleeping human.

On the basis of the above embodiments, the sleeping human body sign detection module may further include:

a time determination sub-module, configured to determine a time corresponding to each of the target peak based on the pressure curve;

a frequency calculation sub-module, configured to calculate a counting frequency corresponding to each of the body sign from a sleeping human according to the matching between the time from the target peak corresponding to each body sign from sleeping human, wherein the target peak corresponding to the body sign of a sleeping human is a target peak whose pressure value matches the preset pressure interval corresponding to the preset body sign of a sleeping human;

a frequency matching sub-module, configured to match the counting frequency to each body sign of a sleeping human with a preset frequency interval corresponding to each body sign of a sleeping human respectively; and a second determination sub-module, configured to determine that the pressure information collected within the continuous preset duration includes the parameter of the body sign of a sleeping human if there are sleeping human body signs whose counting frequency matches the preset frequency interval.

On the basis of the above embodiments, the pressure detection module may include:

a pressure sensor, disposed under the mattress and configured to collect an analog pressure signal from the bed;

an amplifier, configured to amplify the analog pressure signal;

a filter circuit, configured to filter the amplified analog pressure signal; and an analog-to-digital converter, configured to convert the filtered analog pressure signal into a digital signal, which is used as pressure information from the bed.

Another embodiment of the present disclosure also provides a sleep detector, including the sleep detection apparatus described in any of the above embodiments.

Figure 6:
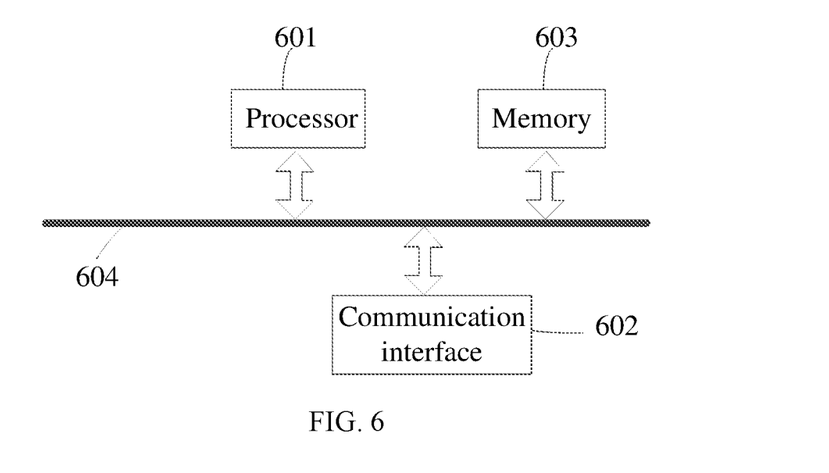
FIG. 6 is a schematic diagram of an electronic device according to an embodiment of the present disclosure.

In another embodiment of the present disclosure, an electronic device is also provided, as shown in FIG. 6, including a processor 601, a communication interface 602, a memory 603 and a communication bus 604. The processor 601, the communication interface 602, and the memory 603 communicate with each other through the communication bus 604.

The memory 603 is configured to store computer programs.

When the processor 601 is configured to execute the computer programs stored in the memory 603, the following steps are implemented:

collecting pressure information from a bed;

detecting the pressure information collected within a continuous preset duration, and determining whether the pressure information includes a parameter of body sign from a sleeping human; and if the pressure information includes the parameter of the body sign from a sleeping human, turning on a sleep detection function to perform the sleep detection.

The communication bus 604 mentioned in the above electronic device may be a Peripheral Component Interconnect (PCI) bus or an Extended Industry Standard Architecture (EISA) bus or the like. The communication bus 604 may be divided into an address bus, a data bus, a control bus, and the like. For ease of presentation, only one thick line is used in FIG. 6, but it does not mean that there is only one bus or one type of bus.

The communication interface 602 is used for communication between the above electronic device and other devices.

The memory 603 may include a Random Access Memory (RAM), and may also include a non-volatile memory, such as at least one disk storage. In some embodiments, the memory may also be at least one storage device located remotely from the aforementioned processor.

The aforementioned processor 601 can be a general-purpose processor, including a Central Processing Unit (CPU), a Network Processor (NP), etc. The aforementioned processor 601 may also be a Digital Signal Processing (DSP), an Application Specific Integrated Circuit (ASIC), a Field-Programmable Gate Array (FPGA) or other programmable logic devices, discrete gate or transistor logic devices, and discrete hardware components.

In another embodiment of the present disclosure, a computer-readable storage medium is also provided, and programs of a sleep detection method is stored in the computer-readable storage medium, and when the programs of the sleep detection method are executed by a processor, any one of the above-mentioned steps of the sleep detection method can be implemented.

When the embodiments of the present disclosure are specifically implemented, reference may be made to the above-mentioned embodiments, which have corresponding technical effects.

It should be noted that, in this document, relational terms such as "first" and "second" etc. are only used to distinguish one entity or operation from another entity or operation, and do not necessarily require or imply any actual relationship or order between these entities or operations. Moreover, terms "including", "including" or any other variation are intended to cover non-exclusive inclusion, so that a process, a method, an article or a device including a list of elements includes not only those elements, but also includes other elements not explicitly listed, or includes other elements inherent to such a process, a method, an article or a device. Without further limitation, an element qualified by the phrase "including a . . . " does not preclude the presence of additional identical elements in a process, a method, an article or a device including a list of elements.

The above descriptions are only specific embodiments of the present disclosure, so that those skilled in the art can understand or implement the present disclosure. Various modifications to these embodiments may be readily apparent to those skilled in the art, and the generic principles defined herein may be implemented in other embodiments without departing from the spirit or scope of the present disclosure. Thus, the present disclosure is not to be limited to the embodiments shown herein but is to be accorded the widest scope consistent with the principles and novel features claimed herein.

What is claimed is:

1. A sleep detection method, comprising:

collecting pressure information from a bed, wherein the pressure information comprises a pressure value;

detecting whether the pressure information contains the pressure value that is greater than a preset pressure threshold, wherein, if the pressure information contains the pressure value that is greater than the preset pressure threshold, judging whether a continuous duration where the pressure value that is greater than the preset pressure threshold in the pressure information is less than a preset duration threshold; and if the duration of the pressure value that is greater than the preset pressure threshold in the pressure information is not less than the preset duration threshold, confirming that the human is on the bed, or if the duration of the pressure value that is greater than the preset pressure threshold in the pressure information is less than the preset duration threshold, confirming that the human is not on the bed;

if the human being on the bed, detecting the pressure information collected within a continuous preset duration, and determining whether the pressure information comprises a parameter of a body sign of a sleeping human; and if the pressure information comprises the parameter of the body sign of the sleeping human, turning on a sleep detection function to perform the sleep detection.

2. The sleep detection method of claim 1, wherein the pressure information comprises a pressure value, the detecting the pressure information collected within a continuous preset duration, and determining whether the pressure information comprises a parameter of a body sign of a sleeping human comprises:
  generating a pressure curve according to the pressure information collected within the continuous preset duration;
  determining peaks in the pressure curve and the pressure values from each of the peaks accordingly;
  matching the pressure value corresponding to each of the peaks with a preset pressure interval corresponding to each preset body sign of sleeping human; and
  if there being target peaks whose pressure value matches the preset pressure interval corresponding to each preset body of sleeping human, determining that the pressure information comprises the parameter of the body sign of the sleeping human.

3. The sleep detection method of claim 2, wherein before determining that the pressure information comprises the parameter of the body sign of the sleeping human, the sleep detection method further comprises:
  determining a time corresponding to each of the target peaks according to the pressure curve;
  calculating a counting frequency corresponding to each body sign of sleeping human according to the matching between the time from the target peak corresponding to each body sign of sleeping human, wherein the target peak corresponding to the body sign of sleeping human is a target peak whose pressure value matches the preset pressure interval corresponding to the preset body sign of sleeping human;
  matching the counting frequency corresponding to each sleeping human body sign with a preset frequency interval corresponding to each sleeping human body sign, respectively; and
  if there is sleeping human body sign whose counting frequency matches the preset frequency interval, determining that the pressure information collected within the continuous preset duration comprises the parameter of a sleeping human body sign.

4. The sleep detection method of claim 1, wherein the sleeping human body sign comprises at least one of heartbeat and breathing.

5. The sleep detection method of claim 1, wherein the pressure information collected from a bed comprises:
  collecting an analog pressure signal from the bed through a pressure sensor disposed under a mattress;
  amplifying the analog pressure signal, and then filtering the amplified analog pressure signal; and
  converting the filtered analog pressure signal into a digital signal, and using the digital signal as the pressure information on the bed.

6. An electronic device, comprising:
  a processor; and
  a memory;
  wherein the processor is configured to execute a processing program based on the data that is stored in the memory, so as to implement a sleep detection method, and the sleep detection method comprises:
  collecting pressure information from a bed, wherein the pressure information comprises a pressure value;
  detecting whether the pressure information contains the pressure value that is greater than a preset pressure threshold, wherein, if the pressure information contains the pressure value that is greater than the preset pressure threshold, judging whether a continuous duration where the pressure value that is greater than the preset pressure threshold in the pressure information is less than a preset duration threshold; and if the duration of the pressure value that is greater than the preset pressure threshold in the pressure information is not less than the preset duration threshold, confirming that the human is on the bed, or if the duration of the pressure value that is greater than the preset pressure threshold in the pressure information is less than the preset duration threshold, confirming that the human is not on the bed;
  if the human being on the bed, detecting the pressure information collected within a continuous preset duration, and determining whether the pressure information comprises a parameter of a body sign of a sleeping human; and
  if the pressure information comprises the parameter of the body sign of the sleeping human, turning on a sleep detection function to perform the sleep detection.

7. The electronic device of claim 6, wherein the pressure information comprises a pressure value, the detecting the pressure information collected within a continuous preset duration, and determining whether the pressure information comprises a parameter of a body sign of a sleeping human comprises:
  generating a pressure curve according to the pressure information collected within the continuous preset duration;
  determining peaks in the pressure curve and the pressure values from each of the peaks accordingly;
  matching the pressure value corresponding to each of the peaks with a preset pressure interval corresponding to each preset body sign of sleeping human; and
  if there being target peaks whose pressure value matches the preset pressure interval corresponding to each preset body of sleeping human, determining that the pressure information comprises the parameter of the body sign of the sleeping human.

8. The electronic device of claim 7, wherein before determining that the pressure information comprises the parameter of the body sign of the sleeping human, the sleep detection method further comprises:
  determining a time corresponding to each of the target peaks according to the pressure curve;
  calculating a counting frequency corresponding to each body sign of sleeping human according to the matching between the time from the target peak corresponding to each body sign of sleeping human, wherein the target peak corresponding to the body sign of sleeping human is a target peak whose pressure value matches the preset pressure interval corresponding to the preset body sign of sleeping human;
  matching the counting frequency corresponding to each sleeping human body sign with a preset frequency interval corresponding to each sleeping human body sign, respectively; and
  if there is sleeping human body sign whose counting frequency matches the preset frequency interval, determining that the pressure information collected within the continuous preset duration comprises the parameter of a sleeping human body sign.

9. The electronic device of claim 6, wherein the sleeping human body sign comprises at least one of heartbeat and breathing.

10. The electronic device of claim 6, wherein the pressure information collected from a bed comprises:

collecting an analog pressure signal from the bed through a pressure sensor disposed under a mattress;

amplifying the analog pressure signal, and then filtering the amplified analog pressure signal; and converting the filtered analog pressure signal into a digital signal, and using the digital signal as the pressure information on the bed.

11. A non-transitory storage medium, comprising:

one or more programs stored in the storage medium, wherein the one or more programs can be executed by one or more processors to implement a sleep detection method, and the sleep detection method comprises:

collecting pressure information from a bed, wherein the pressure information comprises a pressure value;

detecting whether the pressure information contains the pressure value that is greater than a preset pressure threshold, wherein, if the pressure information contains the pressure value that is greater than the preset pressure threshold, judging whether a continuous duration where the pressure value that is greater than the preset pressure threshold in the pressure information is less than a preset duration threshold; and if the duration of the pressure value that is greater than the preset pressure threshold in the pressure information is not less than the preset duration threshold, confirming that the human is on the bed, or if the duration of the pressure value that is greater than the preset pressure threshold in the pressure information is less than the preset duration threshold, confirming that the human is not on the bed;

if the human being on the bed, detecting the pressure information collected within a continuous preset duration, and determining whether the pressure information comprises a parameter of a body sign of a sleeping human; and if the pressure information comprises the parameter of the body sign of the sleeping human, turning on a sleep detection function to perform the sleep detection.

12. The non-transitory storage medium of claim 11, wherein the pressure information comprises a pressure value, the detecting the pressure information collected within a continuous preset duration, and determining whether the pressure information comprises a parameter of a body sign of a sleeping human comprises:

generating a pressure curve according to the pressure information collected within the continuous preset duration;

determining peaks in the pressure curve and the pressure values from each of the peaks accordingly;

matching the pressure value corresponding to each of the peaks with a preset pressure interval corresponding to each preset body sign of sleeping human; and if there being target peaks whose pressure value matches the preset pressure interval corresponding to each preset body of sleeping human, determining that the pressure information comprises the parameter of the body sign of the sleeping human.

13. The non-transitory storage medium of claim 12, wherein before determining that the pressure information comprises the parameter of the body sign of the sleeping human, the sleep detection method further comprises:

determining a time corresponding to each of the target peaks according to the pressure curve;

calculating a counting frequency corresponding to each body sign of sleeping human according to the matching between the time from the target peak corresponding to each body sign of sleeping human, wherein the target peak corresponding to the body sign of sleeping human is a target peak whose pressure value matches the preset pressure interval corresponding to the preset body sign of sleeping human;

matching the counting frequency corresponding to each sleeping human body sign with a preset frequency interval corresponding to each sleeping human body sign, respectively; and if there is sleeping human body sign whose counting frequency matches the preset frequency interval, determining that the pressure information collected within the continuous preset duration comprises the parameter of a sleeping human body sign.

14. The non-transitory storage medium of claim 11, wherein the pressure information collected from a bed comprises:

collecting an analog pressure signal from the bed through a pressure sensor disposed under a mattress;

amplifying the analog pressure signal, and then filtering the amplified analog pressure signal; and converting the filtered analog pressure signal into a digital signal, and using the digital signal as the pressure information on the bed.

* * * * *